US012796608B2

(12) United States Patent
Vandeven et al.

(10) Patent No.: US 12,796,608 B2
(45) Date of Patent: Nov. 17, 2026

(54) WING BALANCE COMPENSATION SYSTEM

(71) Applicant: DEERE & COMPANY, Moline, IL (US)

(72) Inventors: Michael L. Vandeven, LeClaire, IA (US); Alex Brimeyer, Bettendorf, IA (US); Dillon M. Burke, Camanche, IA (US)

(73) Assignee: DEERE & COMPANY, Moline, IL (US)

( * ) Notice: Subject to any disclaimer, the term of this patent is extended or adjusted under 35 U.S.C. 154(b) by 1205 days.

(21) Appl. No.: 17/731,154

(22) Filed: Apr. 27, 2022

(65) Prior Publication Data

US 2023/0345876 A1 Nov. 2, 2023

(51) Int. Cl.
*A01D 41/14* (2006.01)
*A01D 41/127* (2006.01)

(52) U.S. Cl.
CPC ......... *A01D 41/141* (2013.01); *A01D 41/127* (2013.01); *A01D 41/145* (2013.01)

(58) Field of Classification Search
CPC .. A01D 41/141; A01D 41/127; A01D 41/145; A01D 41/148; A01D 41/144; A01D 47/00; A01D 61/002
See application file for complete search history.

(56) References Cited

U.S. PATENT DOCUMENTS

| | | | | |
|---|---|---|---|---|
| 5,471,825 | A | 12/1995 | Panoushek et al. | |
| 9,668,412 | B2 * | 6/2017 | Ritter | A01D 41/141 |
| 2003/0074876 | A1 | 4/2003 | Patterson et al. | |
| 2018/0368317 | A1 * | 12/2018 | Schulze Selting | A01D 41/141 |
| 2020/0000032 | A1 | 1/2020 | Shearer et al. | |
| 2020/0100420 | A1 * | 4/2020 | Sporrer | A01B 63/1112 |
| 2020/0390035 | A1 * | 12/2020 | Hunt | A01D 41/127 |
| 2021/0185917 | A1 * | 6/2021 | Hunt | A01D 41/144 |
| 2023/0309441 | A1 * | 10/2023 | Thomas | G01L 1/2206 56/10.2 A |
| 2024/0180078 | A1 * | 6/2024 | Barnett | A01D 41/144 |

FOREIGN PATENT DOCUMENTS

| | | | |
|---|---|---|---|
| CN | 112616445 | A | 4/2021 |
| EA | 013834 | B1 | 8/2010 |

* cited by examiner

*Primary Examiner* — Robert E Pezzuto

(57) ABSTRACT

A harvester includes a frame and a header coupled to the frame. The header includes a center segment, a wing coupled to the center segment, and an actuator between the wing and the center segment. The wing includes a ground-engaging component configured to bear a first variable portion of the weight of the wing and a wing sensor coupled to the wing. The actuator is configured to transfer a second variable portion of the weight of the wing to the frame. A controller is configured to receive a signal from the wing sensor and to send a signal to the actuator to vary a ratio of the first variable portion of the weight of the wing to the second variable portion of the weight of the wing.

12 Claims, 11 Drawing Sheets

WING BALANCE COMPENSATION SYSTEM

BACKGROUND

The present disclosure relates to agricultural equipment, and more particularly to harvesting equipment, and even more particularly to combine headers.

SUMMARY

A harvester includes a frame and a header coupled to the frame. The header includes a center segment, a wing coupled to the center segment, and an actuator between the wing and the center segment. The wing includes a ground-engaging component configured to bear a first variable portion of the weight of the wing and a wing sensor coupled to the wing. The actuator is configured to transfer a second variable portion of the weight of the wing to the frame. A controller is configured to receive a signal from the wing sensor and to send a signal to the actuator to vary a ratio of the first variable portion of the weight of the wing to the second variable portion of the weight of the wing.

A header assembly includes a harvester header having a lateral wing section and a hydraulic assembly including a reservoir configured to contain hydraulic fluid, a pump configured to pressurize hydraulic fluid and in fluid communication with the reservoir, and an actuator in fluid communication with the pump and configured to at least partially support the lateral wing section. A controller is configured to receive a measurement signal from a wing sensor, determine whether the measurement signal is within an acceptable range, and selectively adjust hydraulic fluid flow to the actuator in response.

A control system for a harvester includes a position sensor configured to measure a distance between a portion of a harvester header and a support surface over which the harvester travels and to send a signal based thereon. The control system also includes a controller configured to receive the signal, determine whether the measurement signal is within an acceptable range, and selectively actuate an actuator in response. The actuator is operational to adjust a load support distribution of the portion of the harvester header.

Other aspects of the disclosure will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

DETAILED DESCRIPTION

Figure 1:
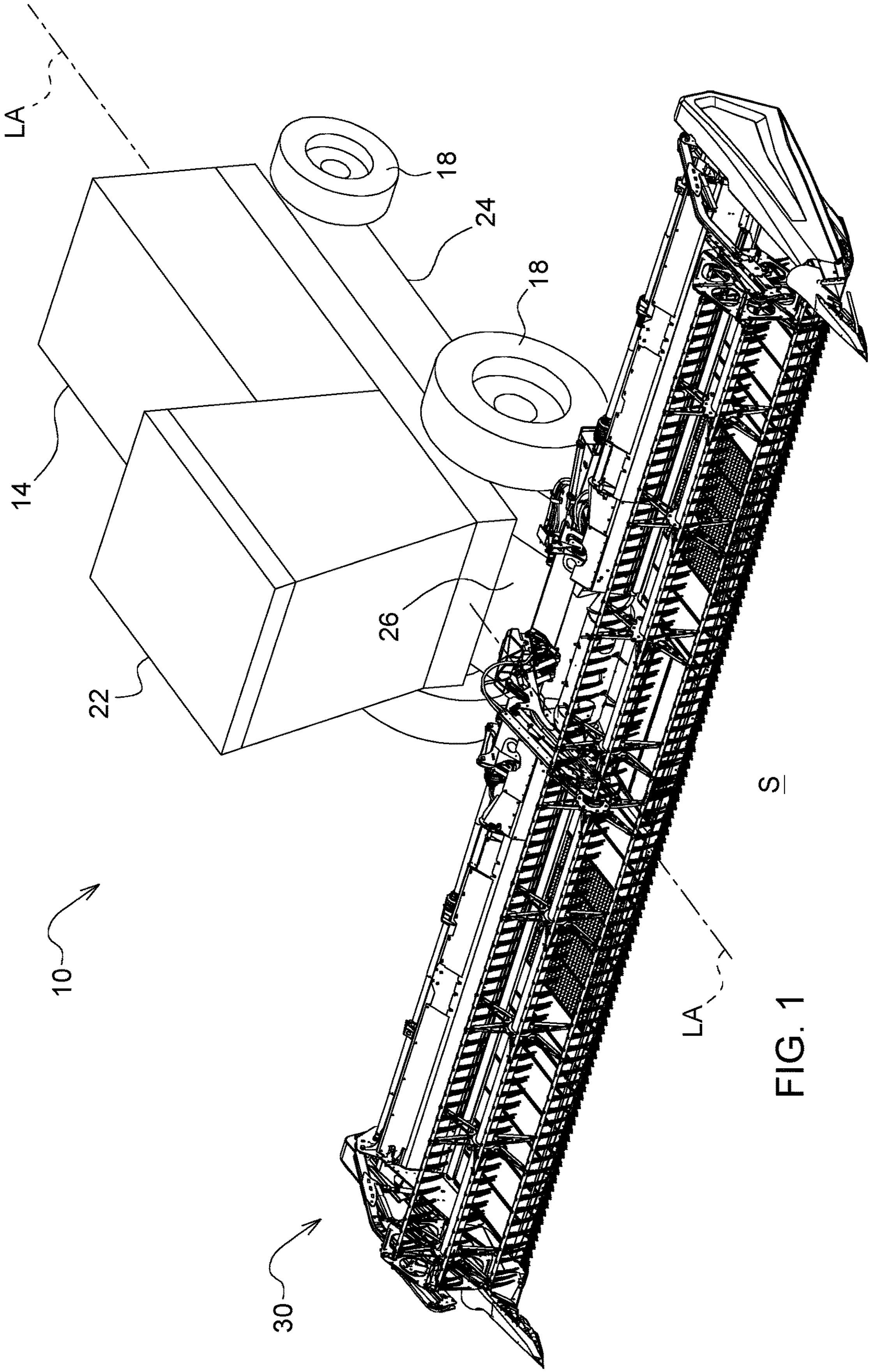
FIG. 1 illustrates a perspective view of an agricultural machine having a header according to an embodiment disclosed herein.
Figure 2:
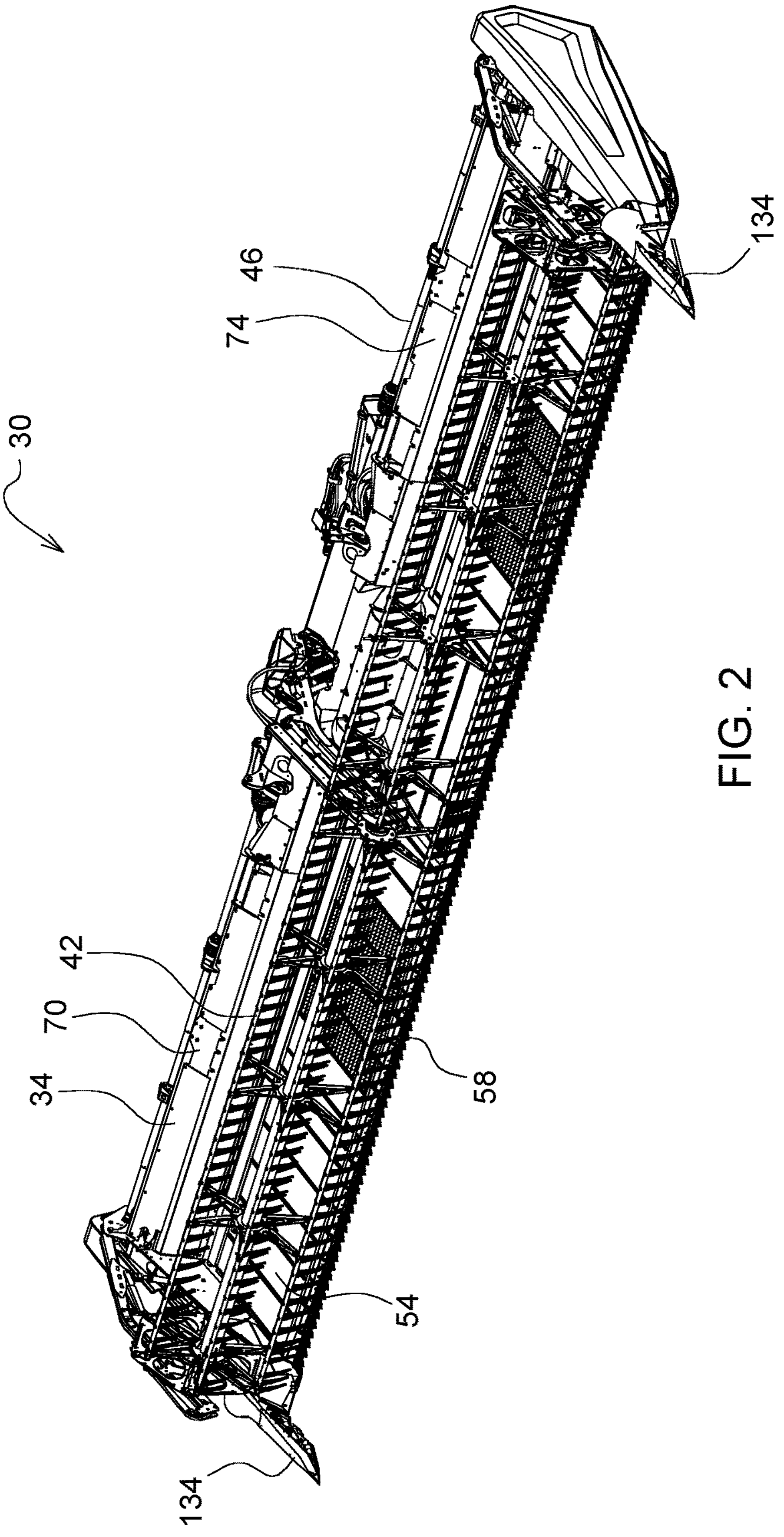
FIG. 2 illustrates a perspective view of the header of FIG. 1.
Figure 3:
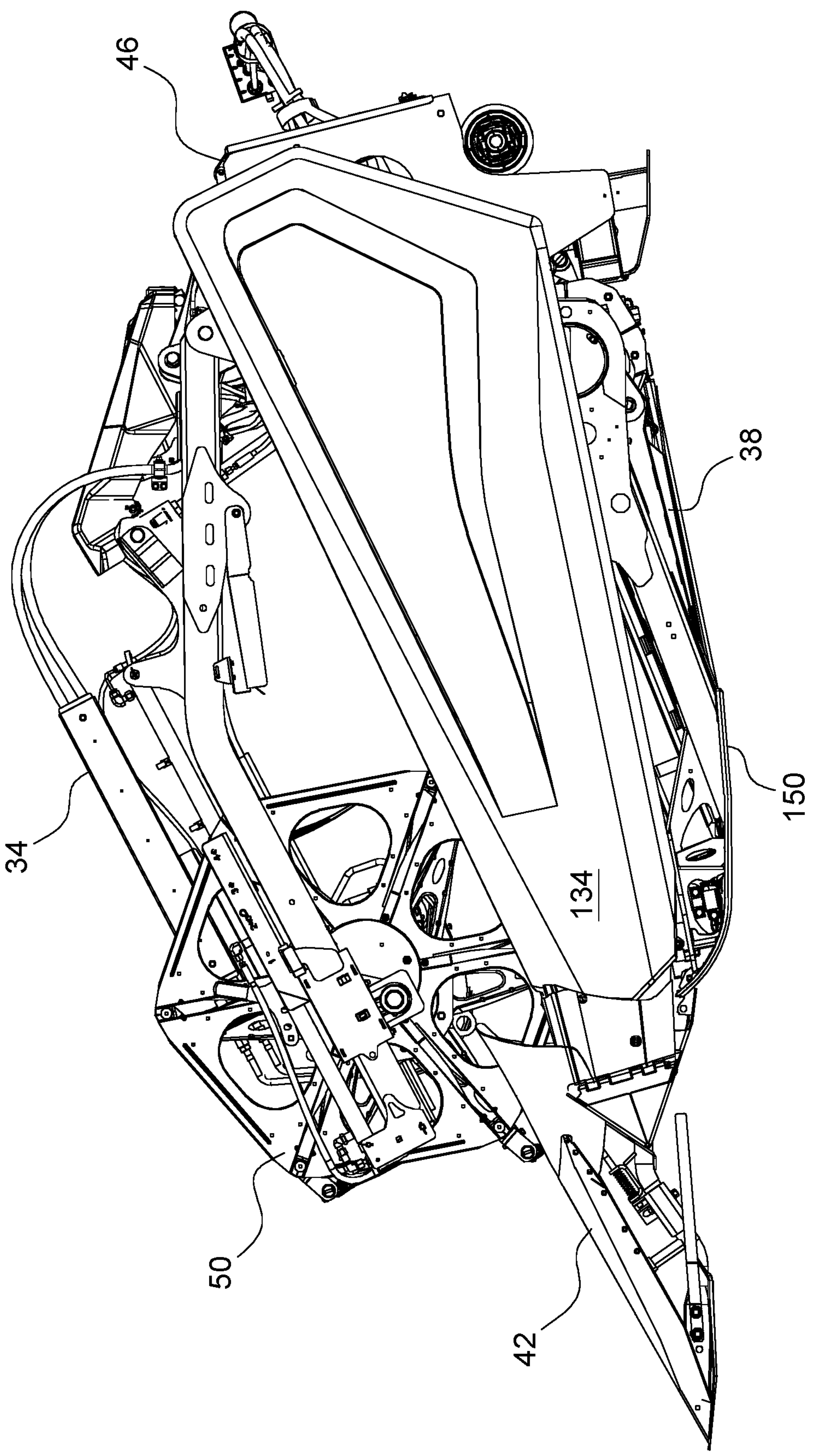
FIG. 3 illustrates a side view of the header of FIG. 1.
Figure 4:
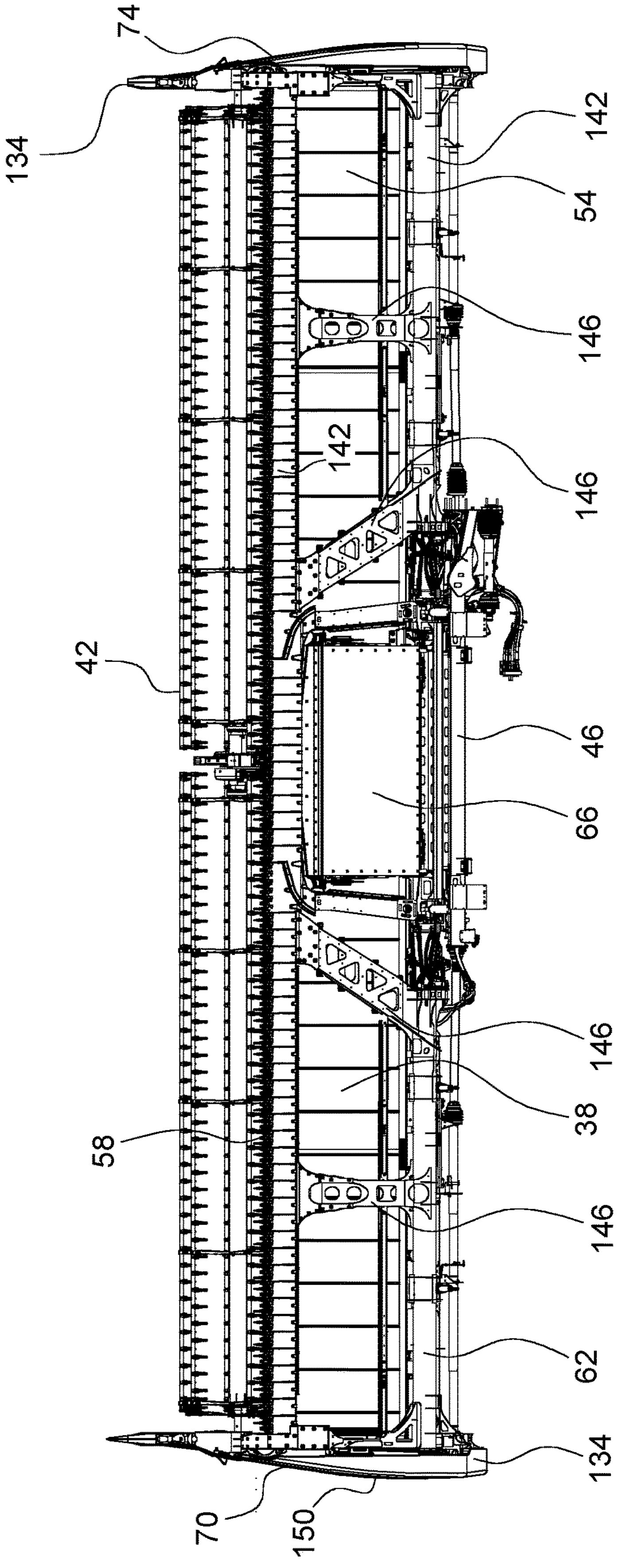
FIG. 4 illustrates a bottom view of the header of FIG. 1.

FIG. 1 illustrates an agricultural machine, which is specifically a self-powered harvester that may also be known as a combine harvester or simply as a combine and which is referred to hereinafter as combine 10. Machines such as combine 10 are commonly used to harvest and thresh crops in a field, the field having a variable ground surface that serves as a support surface S for the combine 10. The combine 10 includes a housing 14, a plurality of vehicle ground-engagement components 18 (e.g., wheel/tire assemblies, tracks, or any other components used to transport the combine 10 over the support surface S), and an operator cab 22 disposed at a front end of the housing 14. A frame 24 supports the housing 14 and operator cab 22, and the ground-engagement components 18 support the frame on the support surface S. The housing 14 includes a longitudinal axis LA and functions as the main body of the combine 10. The longitudinal axis LA is generally parallel to a portion of the support surface S. The combine 10 also includes a feederhouse 26 extending from the front end of the housing 14 generally underneath the operator cab 22 and a header 30 coupled to the feederhouse 26, both of which are supported by the frame 24.

With further reference to FIG. 1, the combine 10 is configured to combine harvesting and threshing operations into one seamless operation, threshing the crop to remove stalk material or straw via a separating system (not shown). The crop grains are thereby separated from the stalk and straw and may be further processed within the housing 14 (e.g., to remove chaff) and ultimately stored within and/or discharged from the housing 14. In some embodiments, the material that has been separated from the crop grains (e.g., stalk, straw, chaff, etc.) may be discharged behind the combine 10 in a windrow. In other embodiments, the material that has been separated from the crop grains may be processed by the combine 10 and discharged relatively uniformly onto the soil surface behind the combine 10. The threshing and processing of crops can be performed by many different methods known to those having ordinary skill in the art.

With reference to FIGS. 2-5, the header 30 for harvesting crops (e.g., corn, wheat, rye, soybeans, etc.) includes a top side 34, a bottom side 38 opposite the top side 34 and configured to approach the support surface S, a front side 42 configured to engage a crop, and a rear side 46 opposite the front side 42 and that faces the housing 14. The header 30 may include crop movers such as, but not limited to, a rotatable reel 50 and a rotatable conveyor 54. The crop movers move the crop within the header 30 and generally in the direction of the feederhouse 26. The rotatable conveyor 54 includes belts which may be known as draper belts such that a header 30 that includes one or more rotatable conveyors 54 in the form of draper belts as crop movers may be known as a draper header. Alternatively, a header that includes one or more augers (not shown) as a crop mover may be known as an auger header. In other embodiments, the header 30 may be any other type of agricultural head, such as a corn head. In some embodiments, the header 30 may cut the crops immediately prior to harvesting them while in other embodiments, the header 30 may harvest pre-cut crops.

With further reference to FIGS. 2-5, the illustrated header 30 is configured to cut a crop and therefore includes a cutter bar 58. Different types of cutter bars 58 are known to those having ordinary skill in the art. For example, a cutter bar 58 may be in the form of a sickle bar. The cutter bar 58 may be in the form of a single-acting or double-acting sickle bar. In some embodiments, a single-acting sickle bar has one set of movable knives and one set of stationary knives. In other embodiments, a double-acting sickle bar has two sets of movable knives. In the illustrated embodiment, the cutter bar 58 may include movable knives and blade guards which include stationary knives. Once the crop is cut by the cutter bar 58, the crop is fed into the feederhouse 26 via the crop movers as described herein. The feederhouse 26 includes further crop transfer components (e.g., a rotating feeder drum, etc.) that draw the crop into the housing 14.

The header 30 includes a frame 62 having a plurality of segments. The plurality of segments may include lateral segments or wings 70, 74 and may further include a center segment 66 between the wings 70, 74. In some embodiments, the header 30 may include a first lateral segment (i.e., a first wing 70) and a second lateral segment (i.e., a second wing 74) as well as the center segment 66. The center segment 66 has a lateral axis A that is transverse to the longitudinal axis LA of the housing, and, when the combine 10 is in a normal working configuration, the lateral axis A is parallel to a portion of the support surface S. In other embodiments, the header 30 may include additional segments. In the illustrated embodiment, the header 30 includes three segments: the center segment 66, the first wing 70, and the second wing 74.

Figure 5:
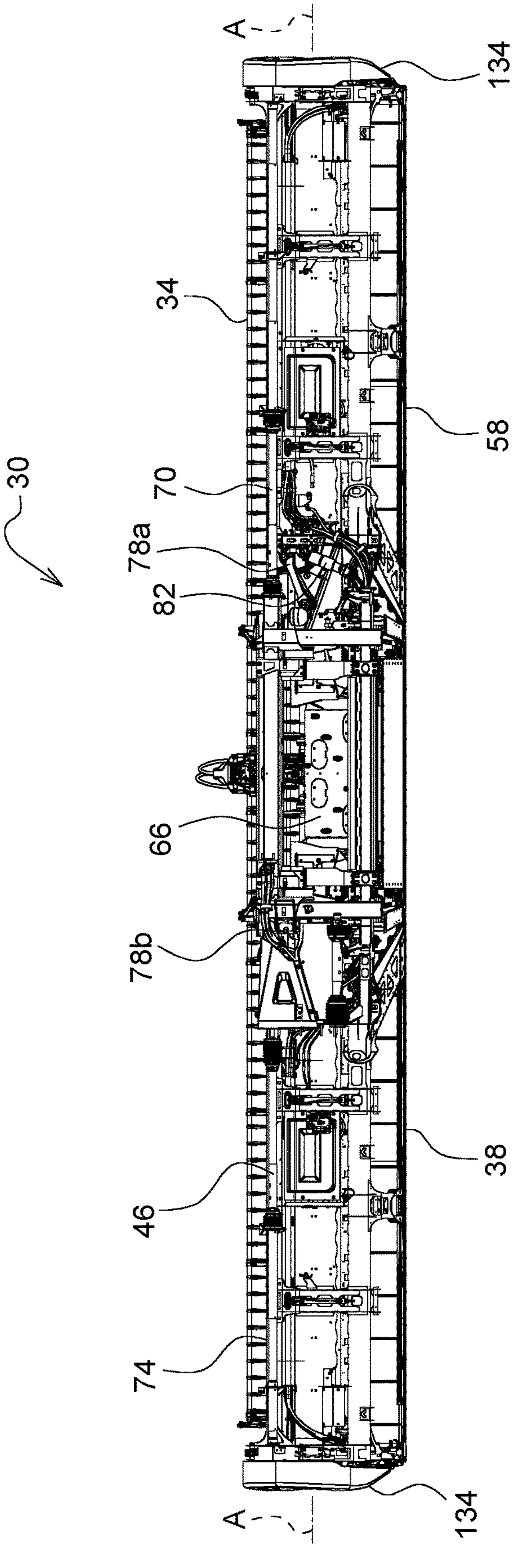
FIG. 5 illustrates a rear view of the header of FIG. 1.

With reference to FIG. 5, each of the wings 70, 74 may be coupled to the center segment 66 by motion control assemblies **78*a*, 78*b*. The motion control assembly 78*a* couples the first wing 70 to the center segment 66, provides stability to the first wing 70, and allows a position of the first wing 70 to be controlled relative to the center segment 66. The motion control assembly 78*b* couples the second wing 74 to the center segment 66, provides stability to the second wing 74, and allows a position of the second wing 74 to be controlled relative to the center segment 66. The motion control assembly 78*b* for the second wing 74 is similar to the motion control assembly 78*a* for the first wing 70. Accordingly, only the motion control assembly 78*a* for the first wing 70 is described in detail herein. From this point onward, the first wing 70, which is the wing being described, will be referred to merely as "the wing 70" rather than as "the first wing 70." Similarly, the motion control assembly 78*a* will be referred to merely as "the motion control assembly 78." The wing 70 may include some, any, or all of the components of the header 30 generally. For example, the wing 70 may include the cutter bar 58 or a portion of the cutter bar 58, the rotatable reel 50, and the rotatable conveyor 54**. It should be understood that, in an embodiment with multiple wings, the wings may function analogously to each other, but may also function independently of each other.

Figure 6:
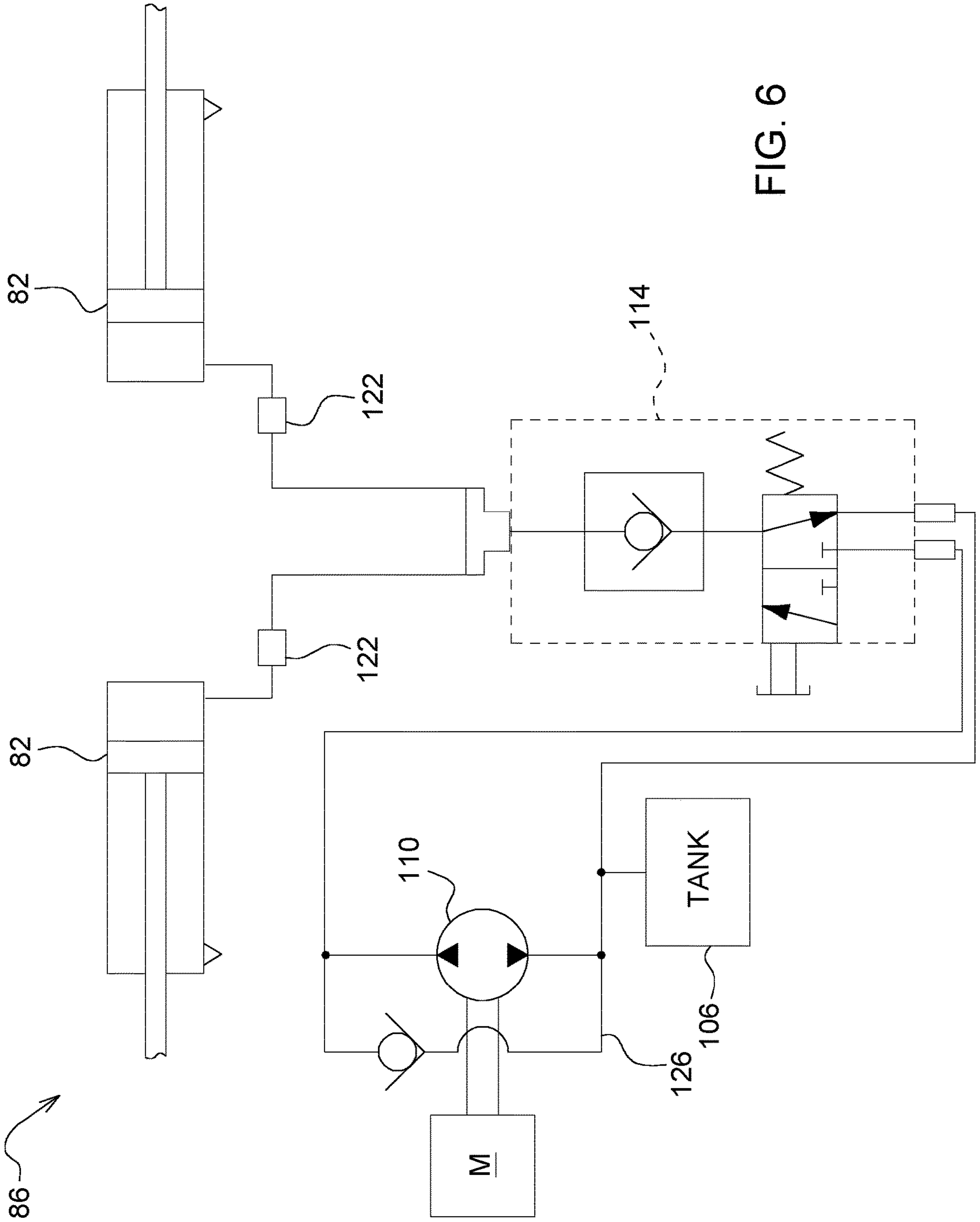
FIG. 6 is a schematic diagram of a hydraulic system of the agricultural machine of FIG. 1.

With reference to FIGS. 5 and 6, the motion control assembly 78 includes an actuator 82 for variable manipulation of the wing 70 and for supporting a variable portion of the load or weight of the wing 70 (ultimately transferred to the frame 24, to the ground-engagement components 18, and to the support surface S). In one embodiment, the actuator 82 may be a hydraulic cylinder and coupled to a hydraulic system 86. In some embodiments, the motion control assembly 78 may include a spring (not shown) cooperative with the actuator 82 and configured to assist with motion control and response. Different configurations of the motion control assembly 78 as are known in the art may result in motion control assemblies 78 that operate differently but achieve operational control of the wing 70 relative to the center segment 66 or to the remainder of the combine 10. The motion control assemblies **78*a*, 78*b* of the wings 70, 74 may operate independently such that, at a given time, the wings 70, 74** of the header may be disposed at different angles relative to the lateral axis A.

With further reference to FIGS. 5 and 6, the hydraulic cylinder 82 may be single-acting or double-acting. In some embodiments, a piston mounting end may be coupled to the wing 70, and the cylinder mounting end may be coupled to the center segment 66 (or to the frame 62, frame 24, or housing 14). In other embodiments, the mounting to the wings and/or center segment may be reversed.

With further reference to FIG. 6, the hydraulic system 86 may include hydraulic fluid, a reservoir 106, a pump 110, an automated valve assembly 114, one or more hydraulic fluid pressure sensors 122, and conduit 126 throughout that enables fluid communication between the system components.

Figure 7:
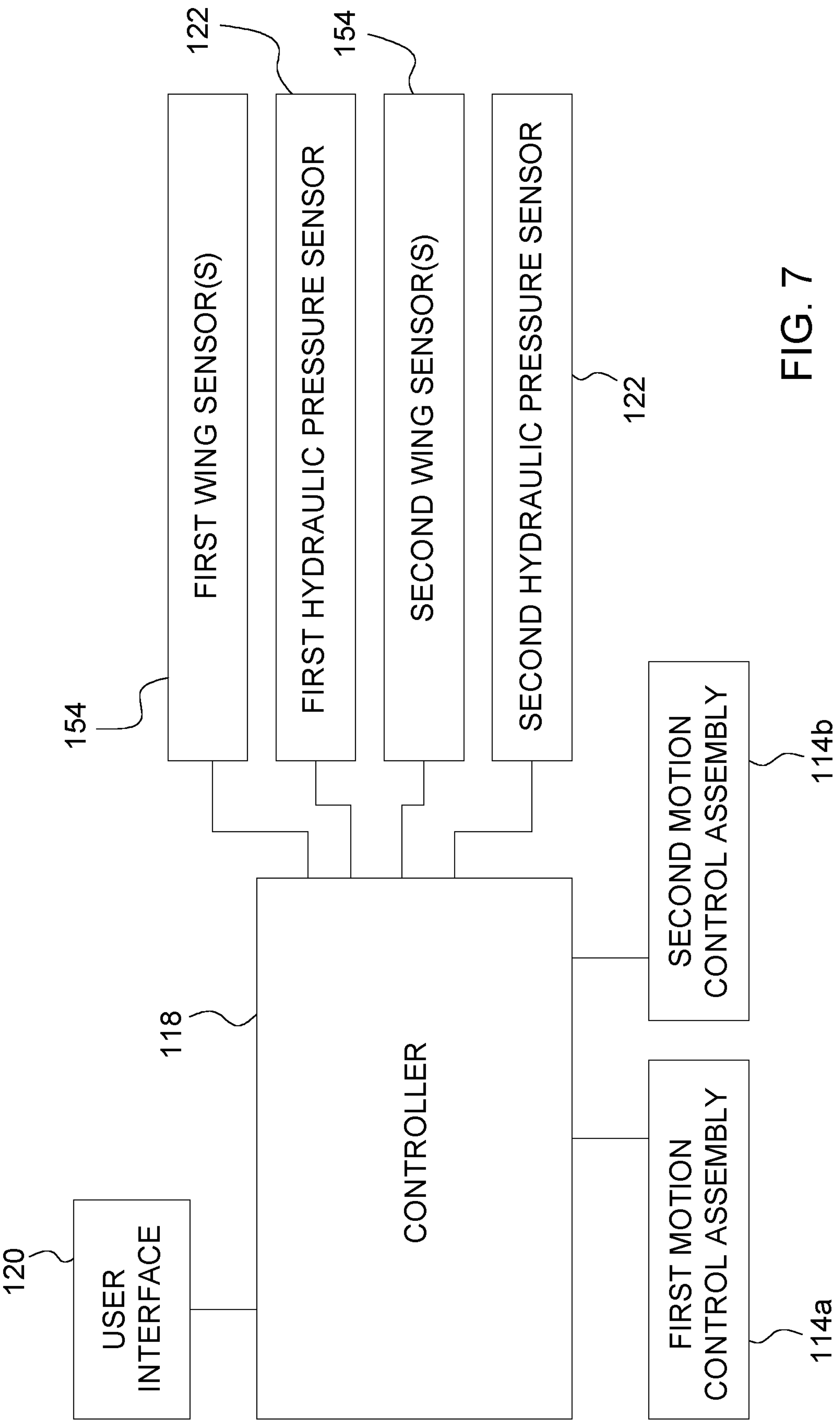
FIG. 7 is a schematic diagram of a control system of the agricultural machine of FIG. 1.

With reference to FIGS. 6 and 7, the reservoir 106 is configured to store hydraulic fluid. The pump 110 is operatively coupled to and in fluid communication with the reservoir 106 such that the pump 110 is configured to pressurize the hydraulic fluid and transmit the hydraulic fluid through hydraulic conduit 126 to components of the hydraulic system 86 such as the hydraulic cylinders 82. The automated valve assembly 114 may be disposed between and in fluid communication with the hydraulic cylinder assembly 82 and the reservoir 106. The automated valve assembly 114 is coupled to and operable by a controller 118 such that the hydraulic pressure delivered to components of the hydraulic system 86 may be adjusted through positional control of the automated valve assembly 114. The automated valve assembly 114 may be of any type adapted for this purpose and may be, as an example, a spool valve.

With further reference to FIG. 6, a hydraulic fluid pressure sensor 122 is disposed within the hydraulic system 86 and is configured to measure the hydraulic pressure delivered to a component of the hydraulic system 86. Specifically, one or more hydraulic fluid pressure sensors 122 may be configured to measure the pressure delivered to each of or both the hydraulic cylinder 82, depending on system location.

With reference again to FIGS. 4 and 5, the wing 70 includes a tip 134 supported by the frame 62 having lateral supports 142 and crossmembers or struts 146. The wing 70 may include weight-bearing components 150 (e.g., wheels, skids, the cutter bar, skids coupled to the cutter bar, etc.) that transmit all of or a portion of the weight of the wing 70 to the support surface S. For example, in some embodiments, a skid at the tip 134 rests on the support surface S to bear a portion of the weight of the wing 70. In other embodiments, the cutter bar 58 may rest on the support surface S and bear a portion of or all of the weight of the wing 70. In yet other embodiments, the wing 70 may include wheels (not shown) that rotate on the ground and bear a portion of or all of the weight of the wing 70. In other embodiments, the cutter bar 58 may rest on the ground and bear a first portion of the weight of the wing 70, and the wing 70 may include wheels that bear a second portion of the weight of the wing 70. A remainder of the weight of the wing 70 may be borne by other parts of the combine 10 through a motion control assembly 78 as discussed herein.

With reference to FIGS. 8A-8J, the wing 70 includes at least one wing sensor 154 coupled thereto. Generally, the wing sensor 154 is configured to measure an aspect or a characteristic of the wing 70 with respect to its surroundings, which include the support surface S (shown in FIGS. 9A-9F). The wing sensor 154 may employ various sensing means, including ground contact sensing, force sensing, distance sensing, and angular sensing. The wing sensor 154 may be a position sensor that senses the relative position of the wing sensor 154 or another component of the wing 70 with respect to the support surface S. If the wing sensor 154 is configured to measure a distance, the wing sensor 154 may utilize beams of light to sense a distance D1 (shown in FIGS. 9A-9F) between the wing sensor 154 and the support surface S. Further, the wing sensor 154 may include a potentiometer, a Hall effect sensor, or other components configured to allow the sensor 154 to determine the position of the wing sensor 154 relative to the support surface S. In some embodiments, the wing sensor 154 may be a force sensor or a pressure sensor coupled to the wing 70 and configured to sense a force borne by one or more of the weight-bearing components 150. The wing sensor 154 may, alternatively, include an inertial measurement unit for measuring angular rate or acceleration of that portion of the wing 70.

Figure 8A:
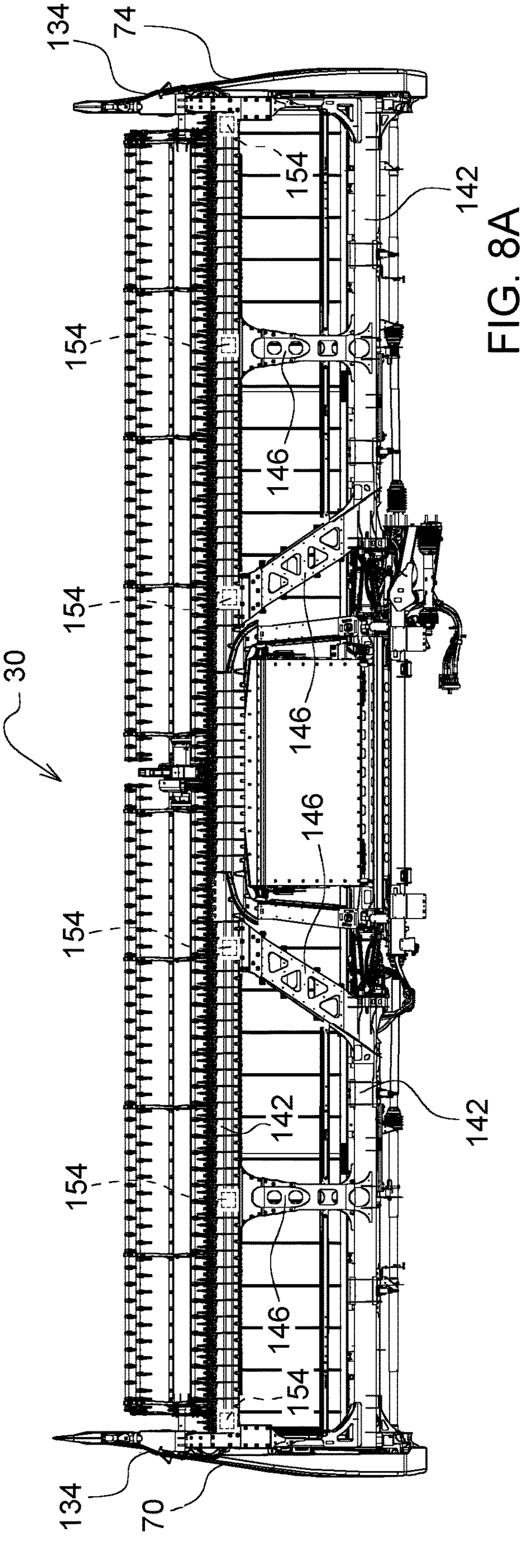
FIG. 8A illustrates an embodiment of the header of FIG. 1 having a plurality of wing sensors.
Figure 8B:
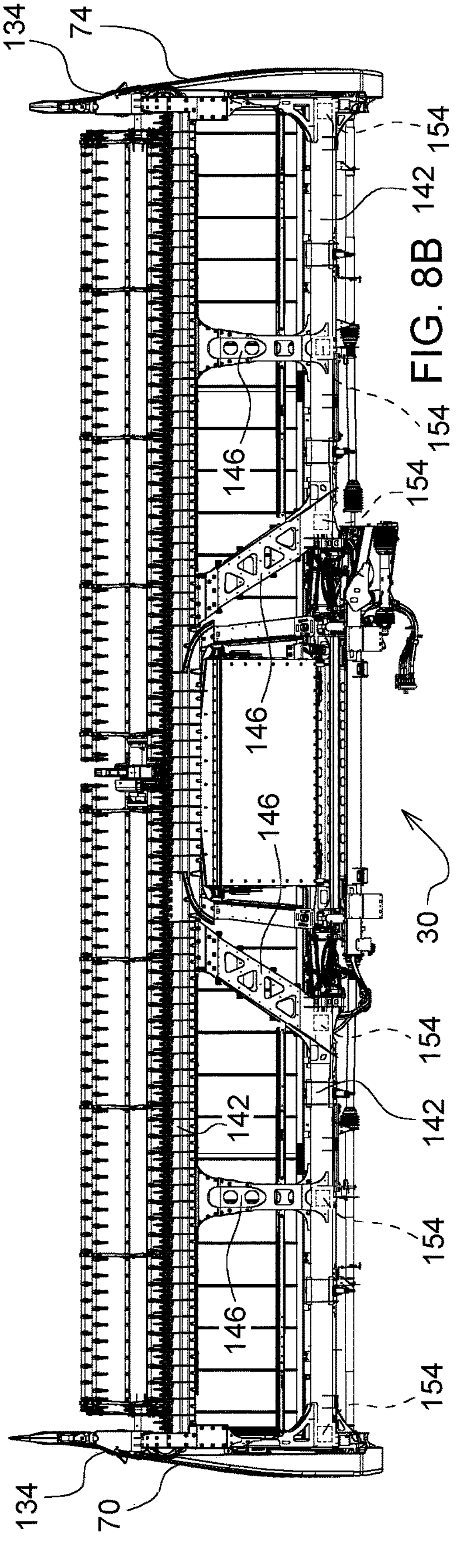
FIG. 8B illustrates another embodiment of the header of FIG. 1 having a plurality of wing sensors.
Figure 8C:
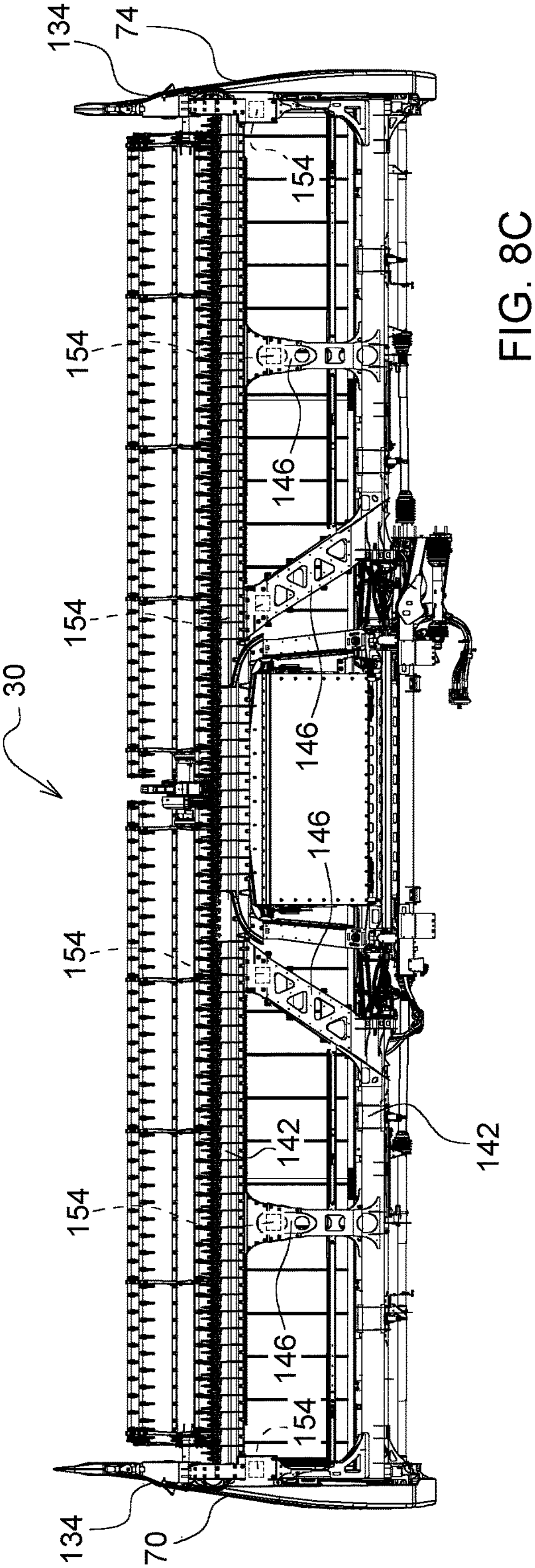
FIG. 8C illustrates another embodiment of the header of FIG. 1 having a plurality of wing sensors.
Figure 8D:
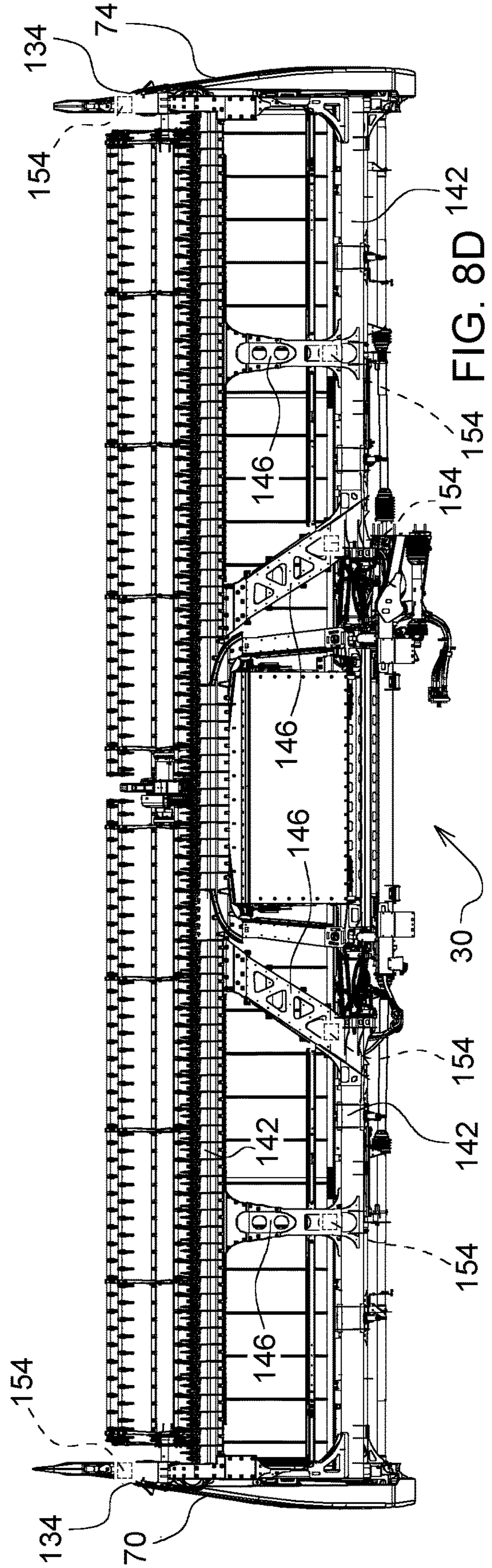
FIG. 8D illustrates another embodiment of the header of FIG. 1 having a plurality of wing sensors.
Figure 8E:
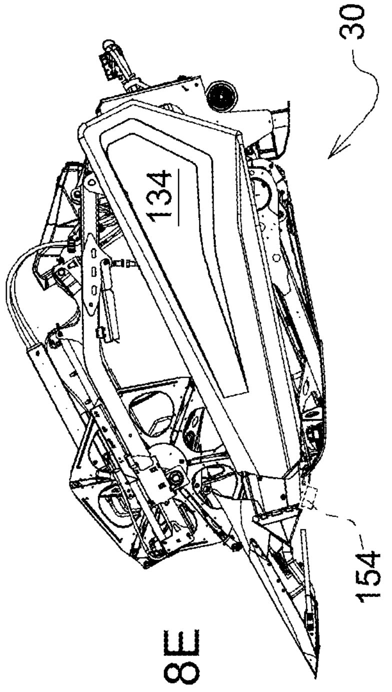
FIG. 8E illustrates another embodiment of the header of FIG. 1 having a wing sensor.
Figure 8F:
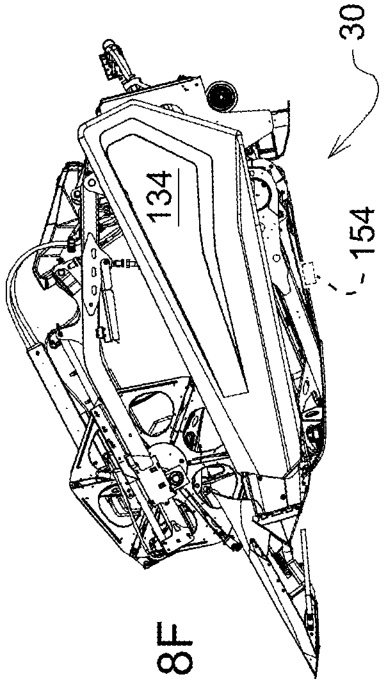
FIG. 8F illustrates another embodiment of the header of FIG. 1 having a wing sensor.
Figure 8G:
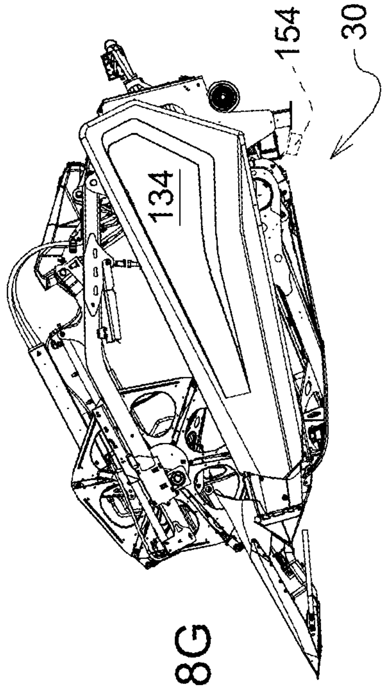
FIG. 8G illustrates another embodiment of the header of FIG. 1 having a wing sensor.
Figure 8H:
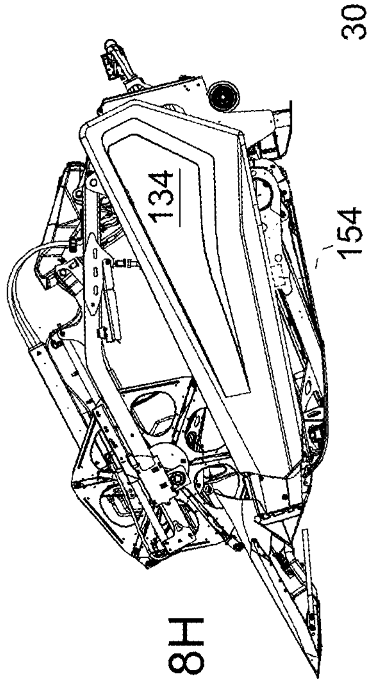
FIG. 8H illustrates another embodiment of the header of FIG. 1 having a wing sensor.
Figure 8I:
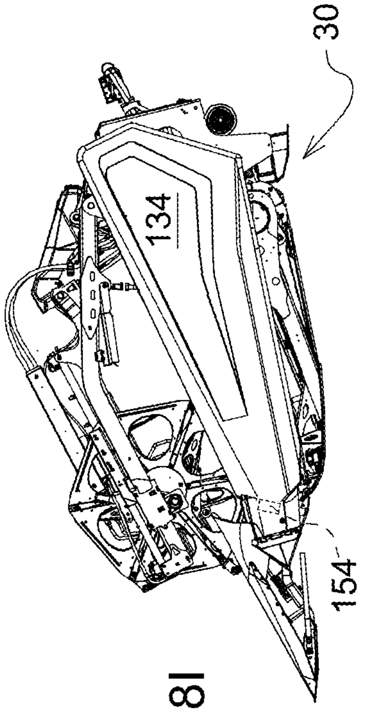
FIG. 8I illustrates another embodiment of the header of FIG. 1 having a wing sensor.
Figure 8J:
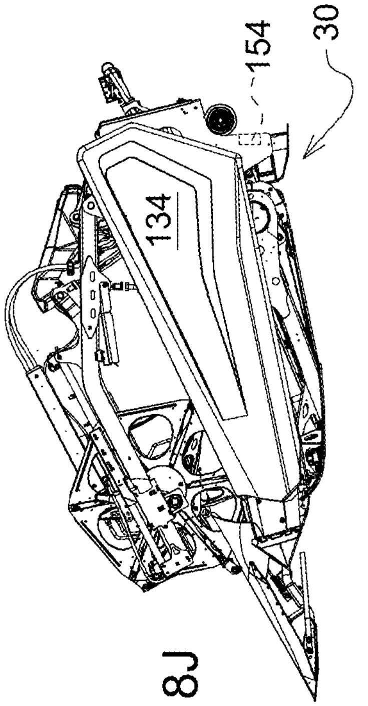
FIG. 8J illustrates another embodiment of the header of FIG. 1 having a wing sensor.
Figure 9A:
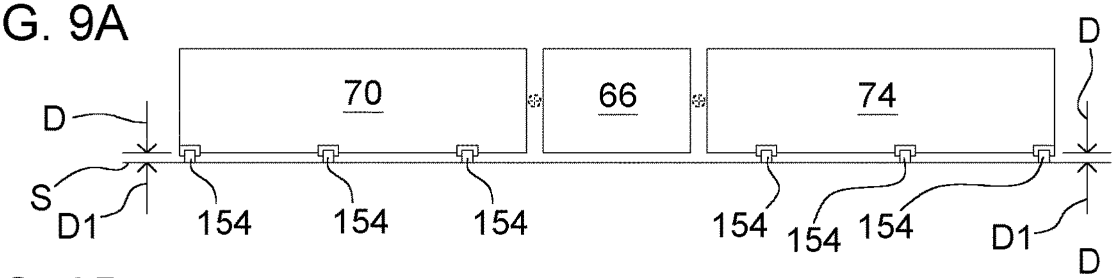
FIG. 9A illustrates the agricultural machine of FIG. 1 relative to a level support surface.
Figure 9B:
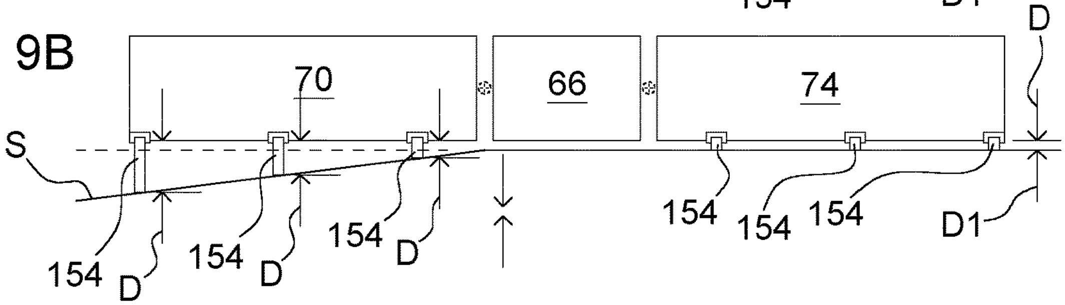
FIG. 9B illustrates the agricultural machine of FIG. 1 relative to a downwardly sloping support surface in a first direction before the header is able to react.
Figure 9C:
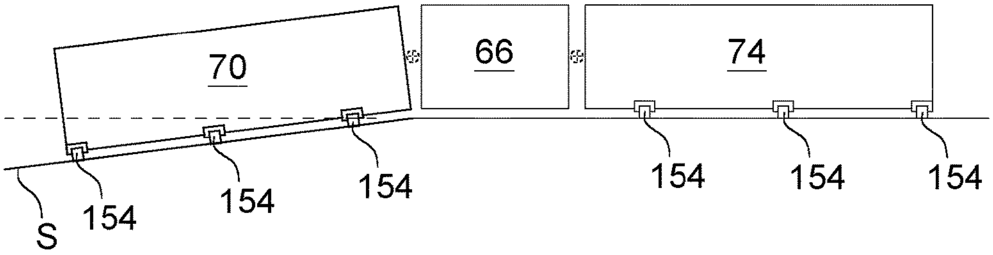
FIG. 9C illustrates the agricultural machine of FIG. 1 relative to a downwardly sloping support surface in the first direction after the header is able to react.
Figure 9D:
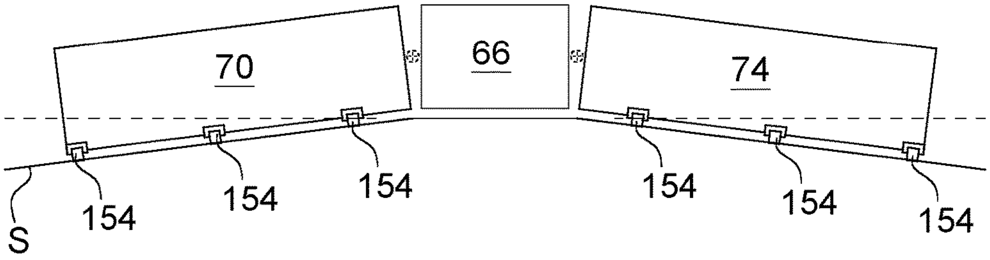
FIG. 9D illustrates the agricultural machine of FIG. 1 relative to a downwardly sloping support surface in the first direction and in a second direction after the header is able to react.
Figure 9E:
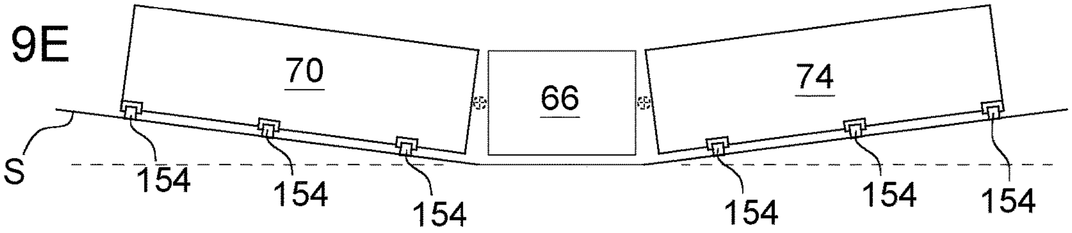
FIG. 9E illustrates the agricultural machine of FIG. 1 relative to an upwardly sloping support surface in the first direction and in the second direction after the header is able to react.
Figure 9F:
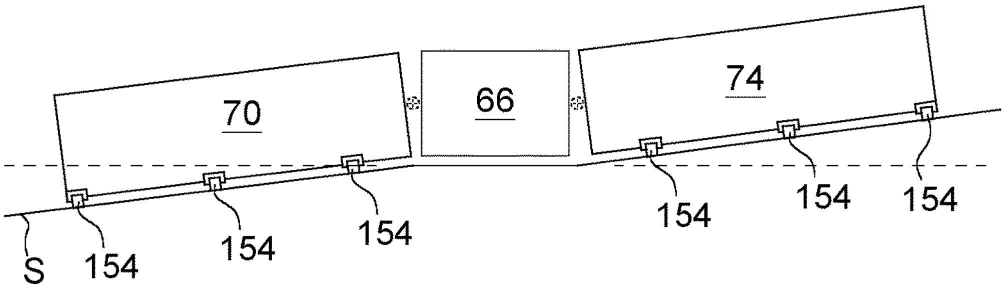
FIG. 9F illustrates the agricultural machine of FIG. 1 relative to a downwardly sloping support surface in the first direction and an upwardly sloping support surface in the second direction after the header is able to react.

The wing sensor 154 may be coupled to the wing 70 at different locations. In one embodiment, one wing sensor 154 is fixedly coupled to the tip 134 of the wing 70 as shown in FIGS. 8E-8J. The wing sensor 154 could also be coupled to the wing 70 at other locations including, for example, the crossmembers 146 (FIGS. 8C and 8D) or the lateral supports 142 (FIGS. 8A and 8B). Although three wing sensors 154 are illustrated in FIGS. 8A-8D, the number of wing sensors 154 on a wing 70 could be one, two, or four or more. In some embodiments, a plurality of wing sensors 154 may be coupled to the wing 70 with different wing sensors 154 coupled to different components. For example, wing sensors 154 could be coupled to the crossmembers 146 as well as to the tip 134 of the wing 70 (FIG. 8D). And each or some of the wing sensors 154 of the plurality of wing sensors 154 could be of different types without limit (two position sensors with one pressure sensor, etc.)

In a preferred embodiment, three wing sensors 154 are coupled to the wing 70. If the wing sensors 154 are position sensors, each wing sensor 154 communicates a signal containing information about the position of that wing sensor 154 relative to the support surface S for determination by the controller 118. The presence of multiple wing sensors 154 produces numerous benefits, including the reduction of sensing anomalies and increased accuracy. For example, sensing anomalies may be generated by a support surface S having localized ridges, valleys, bumps, or low spots. These sensing anomalies may be mitigated by using multiple wing sensors 154, as the measurements of each wing sensor 154 may be compared to the measurements of every other wing sensor 154, or otherwise mathematically combined for greater sensing accuracy, and outlier results may be disregarded or appropriately corrected or mitigated by the controller 118 as necessary. In yet other embodiments, the wing 70 could include a combination of different types of wing sensors 154. All system control described herein is equally applicable to any combination of number, location, or type of sensors associated with a header wing 70.

With reference to FIG. 7, the controller 118 may include a plurality of electrical and electronic components that provide power and operational control to components of the combine 10. For example, the controller 118 may include an electronic processor or central processing unit (e.g., a programmable microprocessor, microcontroller, or similar device), non-transitory, machine-readable memory, and an input/output interface. Software for controlling various aspects of the operation of the combine 10 can be stored in the memory of the controller 118. The software includes, for example, firmware, one or more applications, program data, filters, rules, one or more program modules, and other executable instructions. The controller 118 may be configured to retrieve from memory and execute, among other things, instructions related to the control processes and methods described herein. In other embodiments, the controller 118 may include additional, fewer, or different components. The controller 118 may be operatively coupled to a user interface 120.

With further reference to FIG. 7, the controller 118 specifically may be configured to receive input signals from a plurality of sensors, including the one or more hydraulic fluid pressure sensors 122 and one or more wing sensors 154. The controller 118 is programmed with computer logic and uses the computer logic to evaluate the input signals that it receives, generate instructions in the form of output signals in response to the input signals, and transmit the output signals in the form of wired or wireless communication. The output signals may be delivered to the automated valve assembly 114, the motion control assembly 78, or another component of the combine 10. In the illustrated embodiment, the output signals are delivered to a first automated valve assembly 114*a* and a second automated valve assembly 114*b*. Each automated valve assembly 114*a*, 114*b* controls a respective motion control assembly 78*a*, 78*b*.

In operation of an embodiment having one wing sensor 154 configured as a position sensor and fixedly coupled to the tip 134 of the wing 70 (as shown in FIGS. 8E-8J), and with additional reference to FIG. 7, the wing sensor 154 senses the distance from the wing 70 to the support surface S. The wing sensor 154 is operatively coupled to the controller 118, and conditions measured by the wing sensor 154 are transformed into electrical signals and transmitted to the controller 118. The controller 118 determines whether the motion control assembly 78 needs to be adjusted based at least in part on the sensed condition, and if so, the controller 118 determines an amount or magnitude by which the motion control assembly 78 needs to be adjusted. In making this determination, the controller 118 may also consider information received from the hydraulic fluid pressure sensor 122 and other sensors that may be disposed on the combine 10. If the controller 118 determines that the motion control assembly 78 needs to be adjusted, then the controller 118 sends a signal to the motion control assembly 78 or to the associated hydraulic system 86 to effectuate the adjustment.

In further operation, the hydraulic pressure applied to the motion control assembly 78 (e.g., cylinder 82) affects the load distribution of the wing 70, which may be in the form of a weight load ratio of the wing weight supported by weight bearing component(s) 150 to the wing weight supported by the motion control assembly 78 (or the actuator 82), which is ultimately supported through the vehicle by the ground-engagement components 18. In some embodiments, this application of hydraulic pressure also directly affects the angle of the wing 70 relative to the support surface S.

In particular, when the combine 10, including the header 30, is operational over the support surface S, the motion control assembly 78 may be active to support a first variable portion of the weight of the wing 70 while a second variable portion of the weight of the wing 70 is supported by the support surface S through the weight bearing component(s) 150. In some embodiments, the proportion of the weight of the wing 70 supported by the motion control assembly 78 is 90-97% of the weight of the wing 70. In other embodiments, the motion control assembly 78 may support more or less of the wing weight. In one embodiment, a more extended cylinder 82 may allow the weight-bearing components 150 to support a greater proportion of or all of the weight of the wing 70. In other embodiments having different geometry, a more retracted cylinder 82 may allow the weight-bearing components 150 to support a greater proportion of or all of the weight of the wing 70.

In operation, and as shown in FIGS. 9A-9F, the combine 10 travels across a field during a harvesting operation. In order to minimize wear on the combine 10 and maximize crop harvesting efficiency, the header 30, including the wings 70, 74 and the center segment 66, most efficiently move along the support surface S and follow the contours of the support surface S. If the amount of wing weight supported by the motion control assembly 78 is a relatively greater percentage of the weight of the wing 70, then the proportion of wing weight borne by the weight-bearing components 150 will be less. If the amount of wing weight supported by the motion control assembly 78 is too great, then the wing 70 will tend to react slowly as the wing 70 moves along the contours of the support surface S. This can result in missed crop during harvesting.

Measurements from wing sensors 154 may be used by the controller 118 to selectively vary the reaction of the wing 70 during a harvesting operation though brief adjustment of the motion control assembly 78. Generally, the controller 118 uses measurements received from the wing sensors 154 to determine the proper reaction of the wing 70, and therefore movement of the wing 70, to changes in support surface S contour.

As an example, if the support surface S begins to slope downward in proximity to a sensor 154 during harvesting, the sensor 154 will detect a changing relationship between the associated wing 70 and the support surface S in the form of an increasing distance therebetween. The controller 118 will determine that the wing 70 is not maintaining the most effective harvesting distance from the support surface S and adjust the motion control assembly 78 to more quickly maintain that effective distance through more rapid wing movement to once again achieve the proper proximity between the sensor 154 and the support surface S. This may be done by temporarily reducing the hydraulic pressure within the cylinder 82 by bleeding hydraulic fluid into the reservoir 106. Once the sensor 154 detects a change to a more effective distance is approaching, i.e., the distance sensed by sensor 154 is decreasing satisfactorily or has decreased to a proper distance, the controller 118 once again adjusts the motion control assembly 78 to achieve a desired reaction and movement of the wing 70 relative to the support surface S.

Depending on factors including the crop to be harvested, soil and field conditions, the size and weight of the header 30, and the operating speed of the combine 10, a desired or predetermined distance D1 exists between the wing sensor 154 and the support surface S for a given soil type. A distance between the wing sensor 154 and the support surface S that is less than D1 indicates that the weight-bearing components 150 of the wing 70 or another portion of the wing 70 may be excessively "digging" into the support surface S. Alternatively, a distance between the wing sensor 154 and the support surface S that is more than D1 indicates that the weight-bearing components 150 of the wing 70 are likely floating an unacceptably large distance away from the support surface S and not following the contours of the support surface S to achieve optimum harvesting. In either case, the weight of the wing 70 borne by the motion control assembly 78 may need to be adjusted by manipulating the hydraulic system 86 (actuator 82) to permit the wing 70 to react and move efficiently over the support surface S in response to a changing surface contour.

In all instances, the controller 118 is configured to repeat this process as necessary to drive the distance between the wing 70 and the support surface S to the desired or predetermined distance D1 or within an acceptable tolerance from the desired or predetermined distance D1 and to do so more quickly than can a passive assembly without such wing motion control.

In other applications, the controller 118 may not manipulate the motion control assembly 78 based on a distance D1, but instead based on an angle of the wing 70 relative to a first or 'home' position of wing 70 (which may be relative to lateral axis A, see FIG. 5), or by an angular acceleration of wing 70, or by a force or pressure applied to one or more sensors 154. In other words, a similar manipulation of the hydraulic system 86 (actuator 82) thereby proceeds based on desired or predetermined values of relative wing angle, wing angular acceleration, or pressure or force sensed.

With reference to FIG. 9A-9F, the header 30 may include a plurality of wings 70 that each include a wing sensor 154.

Each wing of the plurality of wings 70 may be controlled and actuated independently as described above depending on field conditions.

Various features of the disclosure are set forth in the following claims.

What is claimed is:

1. A harvester comprising:

a frame;

a header coupled to the frame, the header including a center segment, a wing coupled to the center segment, and an actuator between the wing and the center segment, wherein the wing includes:

a ground-engaging component configured to bear a first variable portion of the weight of the wing, and a wing sensor coupled to the wing, wherein the actuator is configured to transfer a second variable portion of the weight of the wing to the frame, wherein a controller is configured to receive a signal from the wing sensor and to send a signal to the actuator to vary a ratio of the first variable portion of the weight of the wing to the second variable portion of the weight of the wing, wherein the wing sensor is a force sensor or pressure sensor configured to measure an amount of force or pressure applied thereto by a support surface over which the harvester travels, and wherein the wing sensor is attached to the ground-engaging component.

2. The harvester of claim 1, wherein the wing is a first wing and the actuator is a first actuator, and further including a second wing coupled to the center segment and a second actuator coupled between the second wing and the center segment, wherein the second wing includes a ground-engaging component configured to bear a first variable portion of the weight of the second wing, and a wing sensor coupled to the second wing and configured to send a signal to a controller, and wherein the second actuator is configured to transfer a second variable portion of the weight of the second wing to the frame, wherein the controller is configured to receive a signal from the second wing sensor and to send a signal to the second actuator to vary a ratio of the first variable portion of the weight of the second wing to the second variable portion of the weight of the second wing, and wherein the ratio associated with the first wing is determinable by the controller independently of the ratio associated with the second wing.

3. The harvester of claim 2, wherein the controller is configured such that a nonzero ratio associated with the first wing is not equal to a nonzero ratio associated with the second wing.

4. The harvester of claim 1, wherein the wing sensor is one of a plurality of wing sensors and in the form of a position sensor configured to measure a distance between the wing and a support surface over which the harvester travels, and wherein another wing sensor of the plurality of wing sensors is in the form of one of a force sensor, a pressure sensor, or an inertial sensor, and wherein the controller is configured to receive a signal from the another wing sensor and to send the signal to the actuator based on the signal from the wing sensor and the signal from the another wing sensor to vary a ratio of the first variable portion of the weight of the wing to the second variable portion of the weight of the wing.

5. A header assembly comprising:

a harvester header including a lateral wing section;

a hydraulic assembly including:

a reservoir configured to contain hydraulic fluid, a pump configured to pressurize hydraulic fluid and in fluid communication with the reservoir, and an actuator in fluid communication with the pump and configured to at least partially support the lateral wing section;

a first wing sensor, the first wing sensor being a position sensor;

a second wing sensor, the second wing sensor mounted to a ground-engaging component; and a controller configured to receive a first measurement signal from the first wing sensor and a second measurement signal from the second wing sensor and to selectively actuate the actuator based on the first signal and the second signal.

6. The header assembly of claim 5, wherein the first measurement signal is representative of a distance from the sensor to a support surface over which the header assembly operates.

7. The header assembly of claim 6, wherein the first wing sensor comprises a plurality of first wing sensors located on the lateral wing section, wherein each of the first wing sensors is a position sensor, wherein the controller is configured to receive the first measurement signal from each of the plurality of first wing sensors, and wherein each first measurement signal is representative of a distance from the associated first wing sensor of the plurality of first wing sensors to a support surface over which the header assembly operates.

8. The header assembly of claim 5, wherein the first wing sensor comprises a plurality of first wing sensors located on the lateral wing section, wherein the each of the first wing sensors is a position sensor, wherein the controller is configured to receive the first measurement signal from each of the plurality of first wing sensors, wherein one measurement signal of the plurality of first measurement signals is representative of a distance from the associated sensor to a support surface over which the header assembly travels, and wherein the second measurement signal is representative of a force or pressure applied to a portion of the lateral wing section by the support surface.

9. The header assembly of claim 5, wherein the lateral wing section includes a ground-engaging component configured to bear a first variable portion of the weight of the lateral wing section, and wherein the controller is configured to selectively adjust hydraulic fluid flow to the actuator to change a ratio of the first variable portion of the weight of the lateral wing section to a second variable portion of the weight of the lateral wing section supported by the actuator.

10. The header assembly of claim 5, wherein the controller is configured to selectively adjust hydraulic fluid flow to the actuator to change an angle of the lateral wing section relative to a support surface over which the header assembly operates.

11. A control system for a harvester, the control system comprising:

a position sensor configured to measure a distance between a portion of a harvester header and a support surface over which the harvester travels and to send a signal based thereon;

a second sensor being one of a force sensor, a pressure sensor, or an inertial sensor mounted to a ground-engaging component; and a controller configured to receive the signal, determine whether the measurement signal is within a selected range, and selectively actuate an actuator in response, the actuator operational to adjust a load support distribution of the portion of the harvester header, and wherein the controller is configured to receive a signal from the second sensor and to selectively actuate the actuator based on the signal from the position sensor and the second sensor.

12. The harvester of claim 11, wherein the actuator is operational to vary an angle of the portion of the harvester header relative to a support surface over which the harvester travels.

* * * * *